Sept. 15, 1964 B. W. MOSS 3,149,289

SIGNAL GENERATOR

Filed Jan. 16, 1957 2 Sheets-Sheet 1

BERNARD W. MOSS
INVENTOR

BY [signatures]
ATTORNEYS

Sept. 15, 1964 B. W. MOSS 3,149,289

SIGNAL GENERATOR

Filed Jan. 16, 1957 2 Sheets-Sheet 2

INVENTOR
BERNARD W. MOSS

BY [signatures]

ATTORNEYS

United States Patent Office 3,149,289

Patented Sept. 15, 1964

3,149,289
SIGNAL GENERATOR

Bernard W. Moss, Baltimore, Md., assignor to the United States of America as represented by the Secretary of the Navy Filed Jan. 16, 1957, Ser. No. 634,594
2 Claims. (Cl. 331—38)

The present invention relates to a signal generator. More particularly it relates to a signal generator capable of producing a signal linearly modulated both as to amplitude and frequency.

Signal generators producing linearly amplitude and frequency modulated signals are particularly useful in simulating doppler radio signals. The doppler effect is utilized extensively in radio detection devices for the purpose of gauging target speed, separating moving from fixed targets, and so forth.

Accordingly, it is an object of the invention to provide a generator capable of producing signals having doppler characteristics.

Another object of the present invention is to provide a signal generator having an output amplitude which increases linearly with time.

A further object of the present invention is to provide a signal generator capable of generating a sinusoidal voltage having a linearly varying frequency and amplitude.

Other objects and many of the attendant advantages of this invention will be readily appreciated as the same becomes better understood by reference to the following detailed description when considered in connection with the acompanying drawings, wherein.

Figure 1:
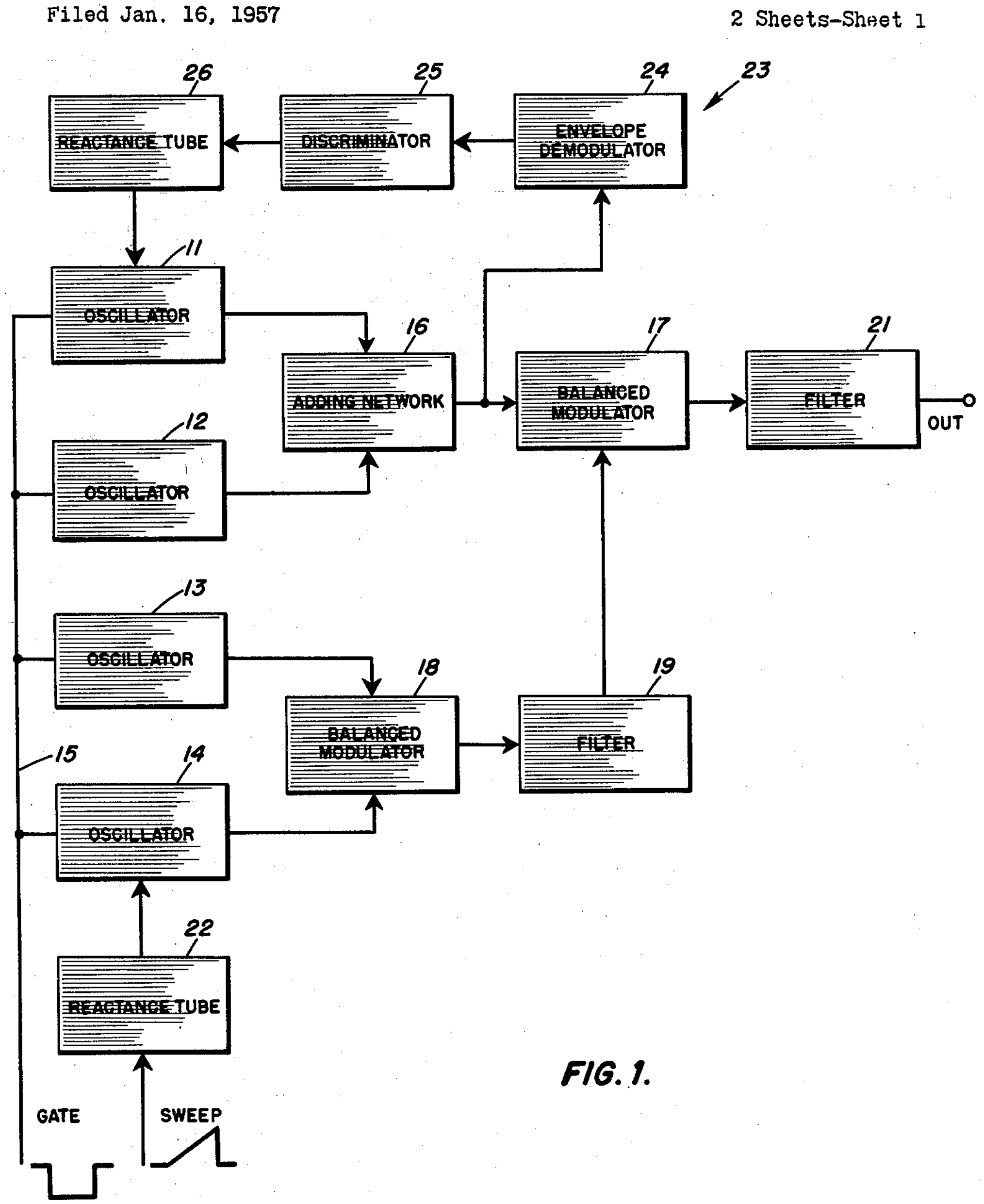
FIG. 1 is a functional block diagram of the present invention.
Figure 3:
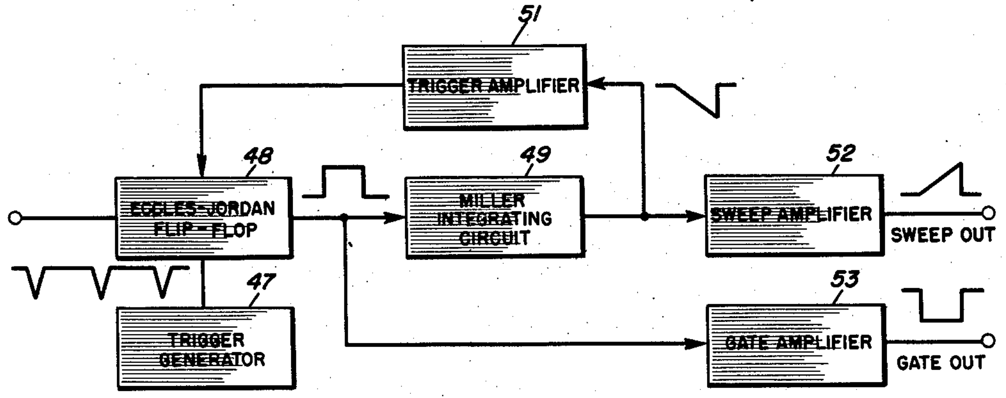
FIG. 3 is a functional block diagram of a sweep and gate voltage generator suitable for use in the present invention.

Referring to the block diagram of FIG. 1, the signal generator includes four stabilized oscillators, 11, 12, 13 and 14, each of which includes provisions for keying the output by means of a gate signal applied to control lead 15. The gate signal may be generated by any conventional means. One such means is illustrated in FIG. 3, to which reference will later be made.

The outputs of oscillators 11 and 12 are added in a suitable network 16, the output of which is applied as one input to a first balanced modulator 17. The outputs of the remaining pair of oscillators 13 and 14 are applied as inputs to a second balanced modulator 18. The unwanted modulation products of modulator 18 are removed by a low pass filter 19 which also passes the desired modulation product to the first balanced modulator 17.

The output of modulator 17, with the undesired modulation products removed by a second low pass filter 21, constitutes the doppler signal output of the generator. In order to provide frequency modulation of the generator output, the frequency of the output of oscillator 14 is linearly varied by a reactance tube 22 controlled by a linearly rising sweep voltage. The sweep voltage is of equal time duration with the gate voltage and generated in the circuit of FIG. 3.

Oscillators 11 and 12 provide outputs oppositely phased and of slightly different frequency for purposes more fully set forth hereinafter. Upon proper adjustment of the frequencies of oscillators 11 and 12 and the length of the gate keying signal, the sum output of network 16 possesses the desired quality of linearly increasing amplitude.

In order to maintain the necessary frequency relationship between oscillators 11 and 12, a frequency control loop 23 is provided. Frequency control loop 23 comprises an envelope demodulator 24, a discriminator 25 for determining the amount of frequency error, and a reactance tube 26 for controlling the frequency of oscillator 11.

The operation of the generator can best be understood by mathematical illustration.

For convenience the various voltages in the generator are identified with subscripts corresponding to the reference numerals of the elements producing them.

The outuput of oscillator 11 is:

$$E_{11}=+\ \sin\ \omega_1 t \qquad (1)$$

and the output of oscillator 12 is:

$$E_{12}=-\ \sin\ \omega_2 t \qquad (2)$$

Adding $E_{11}$ and $E_{12}$, the output of network 16 is found to be $$E_{16}=A_1 \sin\left(\frac{\omega_1-\omega_2}{2}\right)t \cos\left(\frac{\omega_1+\omega_2}{2}\right)t \qquad (3)$$

For small angles, the sine of the angle is very nearly equal to th e angle. Therefore if the angle $$\left(\frac{\omega_1-\omega_2}{2}\right)t,$$

does not exceed $$\frac{\pi}{6}$$

radians, the modulation envelope of signal $E_{16}$, represented by the term sine $$\left(\frac{\omega_1-\omega_2}{2}\right)t,$$

does not depart from linearity in excess of 5 percent. $E_{16}$ may therefore be simplified as $$E_{16}=A_1\left(\frac{\omega_1-\omega_2}{2}\right)t \cos\left(\frac{\omega_1+\omega_2}{2}\right)t$$

In the second balanced modulator 18, the output $$E_{13}=\sin\ \gamma_1 t$$

of oscillator 13 is combined with the output $$E_{14}=\sin\ \gamma_2 t$$

of oscillator 14 to produce a modulation product which includes component frequencies of $(\gamma_1+\gamma_2)$ and $(\gamma_2-\gamma_2)$. High frequency products of modulation are removed by the action of filter 19, so that the filter output is $$E_{19}=A_2 \cos\ (\gamma_1-\gamma_2)t.$$

Combining voltages $E_{16}$ and $E_{19}$ in the first balanced modulator 17 and eliminating the higher frequency terms from the modulator output by means of filter 21 results in a signal voltage output of $$E_{21}=A_3\left(\frac{\omega_1-\omega_2}{2}\right)t \cos\left[\left(\frac{\omega_1+\omega_2}{2}\right)-(\gamma_1+\gamma_2)\right]t$$

The value of the constant $A_3$ depends upon the gain of the modulators, the amplitude of the oscillator outputs, and the attenuation of the filters. As these various factors may be readily assigned suitable values, the peak signal amplitude may be arranged to have any desired value.

As a specific example of a signal output obtainable from the generator, assume that $A_3=12$, and that the oscillator frequencies are as follows:

Oscillator 11, $\omega_1=5008.33$ c.p.s.
Oscillator 12, $\omega_2=4991.67$ c.p.s.
Oscillator 13, $\gamma_1=50,000$ c.p.s.
Oscillator 14, $\gamma_2=45,400$ c.p.s.

Then $$\left(\frac{\omega_1-\omega_2}{2}\right)=8.33 \text{ c.p.s., and } (\gamma_1-\gamma_2)=4600 \text{ c.p.s.}$$

Then the envelope frequency is $$\left(\frac{\omega_1-\omega_2}{2}\right)=8.33 \text{ c.p.s.}$$

and the signal frequency is $$\left(\frac{\omega_1+\omega_2}{2}\right)-(\gamma_1-\gamma_2)=400 \text{ c.p.s.}$$

The gate width is adjusted to be 30° or 1/12 of the period of the envelope. The amplitude at the end of the gating period is one volt and the rise time is 0.01 second. The rate of rise is therefore 100 volts per second. To demonstrate adjustment of the signal generator to a different rate of rise, the frequencies of oscillators 11 and 12 are altered to $$\omega_1=5000.08 \text{ c.p.s., and } \omega_2=4999.92 \text{ c.p.s.}$$

The envelope frequency is then reduced to 0.08 c.p.s. and the rate of rise becomes 0.96 volt per second.

By applying a sweep voltage to reactance tube 22, the frequency of oscillator 14 is reduced from 45,400 c.p.s. to 45,000 c.p.s. The output of the signal generator therefore comprises a sinusoidal voltage having an amplitude which increases linearly with time and a frequency which varies from 400 c.p.s. to 100 c.p.s.

Figure 2:
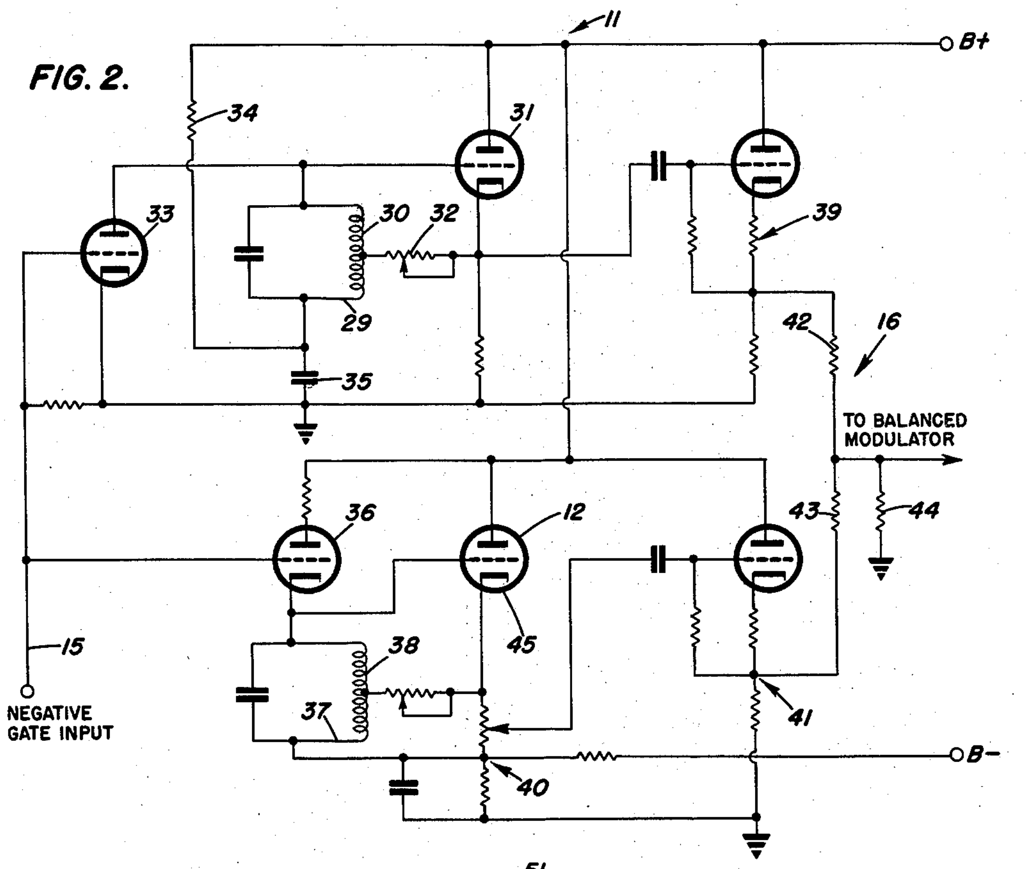
FIG. 2 is a schematic diagram of oscillators suitable for use in the present invention.

For proper operation of the present invention, oscillator 11 must provide a sinusoidal voltage commencing with positive polarity upon the application of a gate pulse thereto and oscillator 12 must commence with negative polarity. An oscillator arrangement found particularly suited to the present application appears in FIG. 2.

Oscillator 11 comprises a resonant circuit 29 including an inductor 30 and a triode 31. A feedback resistor 32 connects the cathode of triode 31 with a tap formed on inductor 30. Adequate voltage gain is provided by autotransformer action in the inductor 30, so that upon proper adjustment of resistor 32, sustained constant amplitude oscillations result. A keying tube 33 is connected in parallel with resonant circuit 29 and is normally sufficiently conductive to damp any oscillations therein. A resistor 34 connected from B+ to the lower end of resonant circuit 29 allows normal current flow through inductor 30 and the keying tube 33 to ground. A blocking capacitor 35 isolates resonant circuit 29 from ground. The time constant of the resistor 34–capacitor 35 combination is preferably many times as long as the duration of the negative gate pulse to prevent appreciable variation in the D.C. potential of the grid of triode 31.

Upon the application of a negative gate pulse to keying tube 33 by way of lead 15, upward current flow through inductor 30 is interrupted. The magnetic field surrounding inductor 30 collapses and the damping is removed from resonant circuit 29. The collapse of the magnetic field tends to maintain current flow in inductor 30 and thus commences oscillations with a positive polarity.

Oscillator 12 is substantially indentical with oscillator 11 except that its keying tube 36 is connected in series with its resonant circuit 37. The cathode of keying tube 36 is returned to a negative voltage source B− through a voltage divider 40. The cathode of triode 45 of oscillator 12 is also returned to B− through voltage divider 40. It is thus possible to maintain the grids of keying tubes 33 and 36 at equal potentials with respect to ground and at the same time to obtain equal conduction through said tubes.

The current flow during conduction of tube 36 is downward through the inductor 38 of resonant circuit 37. Therefore upon cutting off tube 36 by the application of a negative gate, the field surrounding inductor 38 collapses and tends to maintain current flow in a direction opposite that through inductor 30. Oscillator 12 thus commences operation with negative polarity.

The outputs of oscillators 11 and 12 are applied to cathode followers 39 and 41 respectively, which are each of conventional design. Summing network 16 comprises a resistor 42 connected to the output of cathode follower 39 and a resistor connected to the output of cathode follower 41. Resistors 42 and 43 are grounded through a common resistor 44. The voltage appearing at the junction of resistors 42, 43, and 44, comprising the sum of the outputs of oscillators 11 and 12, is applied to balanced modulator 17.

In FIG. 3 there appears a block diagram of a sweep and gate voltage generator suitable for use herein. A trigger generator 47 which may comprise a conventional free running multivibrator supplies triggering pulses to initiate an output from a conventional Eccles-Jordan flip-flop circuit 48. Flip-flop 48 provides a step output voltage of positive polarity which is applied to a Miller-type integrating circuit 49. The output of integrator 49 is a sweep voltage which increases negatively as a linear function of time. The sweep voltage output of integrator 49 is amplified in a trigger amplifier 51 and applied to flip-flop 48. In time the sweep voltage output of integrator 49 reaches a level sufficient to trigger flip-flop 48. The gate output voltage of flip-flop 48 is then cut off to complete a cycle of operation of the gate and sweep generator. A sweep amplifier 52 and a gate amplifier 53 provide amplified inverted output voltages for application to the signal generator illustrated in FIG. 1.

Obviously many modifications and variations of the present invention are possible in the light of the above teachings. It is therefore to be understood that within the scope of the appended claims the invention may be practiced otherwise than as specifically described.

What is claimed is:

1. A signal generator comprising, a first oscillator including keying means, a second oscillator including keying means, the keying means for said first and said second oscillators being arranged to receive a common keying signal, said first and said second oscillators commencing operation in opposite phase upon reception of a keying signal, means for adding the outputs of said first and said second oscillators to provide a sum voltage, a third oscillator including keying means, a fourth oscillator including keying means, a first balanced modulator receiving the outputs of said third and said fourth oscillators and providing a complex output voltage, means for eliminating undesired components from the output of said first balanced modulator, and for passing a desired component, a second balanced modulator receiving said sum voltage and the desired component of said first balanced modulator output and providing a second complex voltage output, and means for eliminating undesired components from said second complex voltage and for passing the desired component constituting the output of the signal generator.

2. Apparatus as claimed in claim 1 wherein said means for eliminating undesired components from the output of said first balanced modulator and said means for eliminating undesired components from the output of said second balanced modulator each comprises a low pass filter.

References Cited in the file of this patent

UNITED STATES PATENTS

| | | |
|---|---|---|
| 2,555,373 | Romander | June 5, 1951 |
| 2,567,410 | Trousdale | Sept. 11, 1951 |
| 2,656,465 | Reeves | Oct. 20, 1953 |
| 2,751,689 | Jones et al. | June 26, 1956 |
| 2,781,450 | Ianouchewsky | Feb. 12, 1957 |
| 2,786,140 | Lewis | Mar. 19, 1957 |
| 2,848,616 | Tollefson | Aug. 19, 1958 |